(12) United States Patent
Lindman

(10) Patent No.: US 11,703,938 B2
(45) Date of Patent: Jul. 18, 2023

(54) EMBEDDED COMPUTING DEVICE

(71) Applicant: Amer Sports Digital Services Oy, Vantaa (FI)

(72) Inventor: Erik Lindman, Vantaa (FI)

(73) Assignee: Suunto Oy, Vantaa (FI)

( * ) Notice: Subject to any disclaimer, the term of this patent is extended or adjusted under 35 U.S.C. 154(b) by 265 days.

(21) Appl. No.: 16/722,038

(22) Filed: Dec. 20, 2019

(65) Prior Publication Data
US 2020/0141827 A1 May 7, 2020

Related U.S. Application Data

(63) Continuation-in-part of application No. 15/784,234, filed on Oct. 16, 2017, now Pat. No. 11,145,272.

(30) Foreign Application Priority Data

Oct. 17, 2016 (FI) ..................................... 20165790
Oct. 17, 2016 (GB) ..................................... 1617575

(51) Int. Cl.
*G06F 1/3293* (2019.01)
*G01L 19/12* (2006.01)
(Continued)

(52) U.S. Cl.
CPC .............. *G01L 19/12* (2013.01); *G01C 5/06* (2013.01); *G01L 15/00* (2013.01); *G06F 1/3293* (2013.01); *G06F 9/4418* (2013.01); *G06F 3/14* (2013.01)

(58) Field of Classification Search
None
See application file for complete search history.

(56) References Cited

U.S. PATENT DOCUMENTS 5,617,848 A * 4/1997 Cochran ................. A62B 9/006
128/201.27
5,899,204 A * 5/1999 Cochran ................. B63C 11/32
128/201.27

(Continued)

FOREIGN PATENT DOCUMENTS

AU        2007216704 A1    4/2008
CN         101408429 A      4/2009
(Continued)

OTHER PUBLICATIONS

Random House Webster's College Dictionary, 1448 (2nd Random House ed. 1999).*

(Continued)

*Primary Examiner* — Parul H Gupta
(74) *Attorney, Agent, or Firm* — Laine IP Oy

(57) ABSTRACT

According to an example aspect of the present invention, there is provided an apparatus comprising a first processing core configured to generate first control signals and to control a display by providing the first control signals to the display via a first display interface, a second processing core configured to generate second control signals and to control the display by providing the second control signals to the display via a second display interface, and the first processing core being further configured to cause the second processing core to enter and leave a hibernation state based at least partly on a determination, by the first processing core, concerning an instruction from outside the apparatus.

24 Claims, 6 Drawing Sheets

(51) Int. Cl.
  *G01L 15/00* (2006.01)
  *G06F 9/4401* (2018.01)
  *G01C 5/06* (2006.01)
  *G06F 3/14* (2006.01)

(56) References Cited

U.S. PATENT DOCUMENTS

| | | |
|---|---|---|
| 5,924,980 A | 7/1999 | Coetzee |
| 6,882,955 B1 | 4/2005 | Ohlenbusch et al. |
| 7,627,423 B2 | 12/2009 | Brooks |
| 7,706,973 B2 | 4/2010 | McBride et al. |
| 7,721,118 B1 | 5/2010 | Tamasi et al. |
| 7,917,198 B2 | 3/2011 | Ahola et al. |
| 7,938,752 B1 | 5/2011 | Wang |
| 8,052,580 B2 | 11/2011 | Saalasti et al. |
| 8,323,188 B2 | 12/2012 | Tran |
| 8,328,718 B2 | 12/2012 | Tran |
| 8,538,693 B2 | 9/2013 | McBride et al. |
| 8,612,142 B2 | 12/2013 | Zhang |
| 8,655,591 B2 | 2/2014 | Van Hende |
| 8,781,730 B2 | 7/2014 | Downey et al. |
| 9,008,967 B2 | 4/2015 | McBride et al. |
| 9,107,586 B2 | 8/2015 | Tran |
| 9,222,787 B2 | 12/2015 | Blumenberg et al. |
| 9,317,660 B2 | 4/2016 | Burich et al. |
| 9,648,108 B2 | 5/2017 | Granqvist et al. |
| 9,665,873 B2 | 5/2017 | Ackland et al. |
| 9,829,331 B2 | 11/2017 | McBride et al. |
| 9,830,516 B1 | 11/2017 | Biswas et al. |
| 9,907,473 B2 | 3/2018 | Tran |
| 9,923,973 B2 | 3/2018 | Granqvist et al. |
| 10,234,290 B2 | 3/2019 | Lush et al. |
| 10,244,948 B2 | 4/2019 | Pham et al. |
| 10,327,673 B2 | 6/2019 | Eriksson et al. |
| 10,433,768 B2 | 10/2019 | Eriksson et al. |
| 10,634,511 B2 | 4/2020 | McBride et al. |
| 2003/0038831 A1 | 2/2003 | Engelfriet |
| 2003/0109287 A1 | 6/2003 | Villaret |
| 2005/0070809 A1 | 3/2005 | Acres |
| 2005/0086405 A1 | 4/2005 | Kobayashi et al. |
| 2006/0068812 A1 | 3/2006 | Carro et al. |
| 2007/0156335 A1 | 7/2007 | McBride et al. |
| 2007/0208544 A1 | 9/2007 | Kulach et al. |
| 2007/0276200 A1 | 11/2007 | Ahola et al. |
| 2008/0052493 A1 | 2/2008 | Chang |
| 2008/0109158 A1 | 5/2008 | Huhtala et al. |
| 2008/0158117 A1* | 7/2008 | Wong .............. G09G 3/20 345/87 |
| 2008/0214360 A1 | 9/2008 | Stirling et al. |
| 2008/0294663 A1 | 11/2008 | Heinley et al. |
| 2009/0048070 A1 | 2/2009 | Vincent et al. |
| 2009/0094557 A1 | 4/2009 | Howard |
| 2009/0100332 A1 | 4/2009 | Kanjilal et al. |
| 2009/0265623 A1 | 10/2009 | Kho et al. |
| 2010/0099539 A1 | 4/2010 | Haataja |
| 2010/0167712 A1 | 7/2010 | Stallings et al. |
| 2010/0187074 A1 | 7/2010 | Manni |
| 2010/0257014 A1 | 10/2010 | Roberts et al. |
| 2010/0313042 A1 | 12/2010 | Shuster |
| 2011/0010704 A1 | 1/2011 | Jeon et al. |
| 2011/0152695 A1 | 6/2011 | Granqvist et al. |
| 2011/0251822 A1 | 10/2011 | Darley et al. |
| 2011/0252351 A1 | 10/2011 | Sikora et al. |
| 2011/0281687 A1 | 11/2011 | Gilley et al. |
| 2011/0283224 A1 | 11/2011 | Ramsey et al. |
| 2011/0288381 A1 | 11/2011 | Barthlomew et al. |
| 2011/0296312 A1 | 12/2011 | Boyer et al. |
| 2011/0307723 A1 | 12/2011 | Cupps et al. |
| 2012/0022336 A1 | 1/2012 | Teixeira |
| 2012/0100895 A1 | 4/2012 | Priyantha et al. |
| 2012/0109518 A1 | 5/2012 | Huang |
| 2012/0116548 A1 | 5/2012 | Goree et al. |
| 2012/0123806 A1 | 5/2012 | Schumann et al. |
| 2012/0185268 A1 | 7/2012 | Wiesner et al. |
| 2012/0219186 A1 | 8/2012 | Wang et al. |
| 2012/0239173 A1 | 9/2012 | Laikari et al. |
| 2012/0283855 A1 | 11/2012 | Hoffman et al. |
| 2012/0289791 A1 | 11/2012 | Jain et al. |
| 2013/0053990 A1 | 2/2013 | Ackland et al. |
| 2013/0095459 A1 | 4/2013 | Tran |
| 2013/0127636 A1 | 5/2013 | Aryanpur et al. |
| 2013/0151874 A1 | 6/2013 | Parks et al. |
| 2013/0178334 A1 | 7/2013 | Brammer |
| 2013/0187789 A1 | 7/2013 | Lowe |
| 2013/0190903 A1 | 7/2013 | Balakrishnan et al. |
| 2013/0217979 A1 | 8/2013 | Blackadar et al. |
| 2013/0218543 A1* | 8/2013 | Bourgeois .............. G01C 21/20 703/8 |
| 2013/0250845 A1 | 9/2013 | Greene et al. |
| 2013/0304377 A1 | 11/2013 | Van Hende |
| 2013/0332286 A1 | 12/2013 | Medelius et al. |
| 2013/0345978 A1 | 12/2013 | Lush et al. |
| 2014/0018686 A1 | 1/2014 | Medelius et al. |
| 2014/0046223 A1 | 2/2014 | Kahn et al. |
| 2014/0094200 A1 | 4/2014 | Schatzberg et al. |
| 2014/0142732 A1 | 5/2014 | Karvonen |
| 2014/0149754 A1* | 5/2014 | Silva ............... G06F 3/0304 713/300 |
| 2014/0163927 A1 | 6/2014 | Molettiere et al. |
| 2014/0218281 A1 | 8/2014 | Amayeh et al. |
| 2014/0228649 A1 | 8/2014 | Rayner et al. |
| 2014/0235166 A1 | 8/2014 | Molettiere et al. |
| 2014/0237028 A1 | 8/2014 | Messenger et al. |
| 2014/0257533 A1 | 9/2014 | Morris et al. |
| 2014/0275821 A1 | 9/2014 | Beckman |
| 2014/0288680 A1 | 9/2014 | Hoffman et al. |
| 2014/0336796 A1 | 11/2014 | Agnew |
| 2014/0337036 A1 | 11/2014 | Haiut et al. |
| 2014/0337450 A1 | 11/2014 | Choudhary et al. |
| 2014/0343380 A1 | 11/2014 | Carter et al. |
| 2014/0350883 A1 | 11/2014 | Carter et al. |
| 2014/0365107 A1 | 12/2014 | Dutta et al. |
| 2014/0372064 A1 | 12/2014 | Darley et al. |
| 2015/0006617 A1 | 1/2015 | Yoo et al. |
| 2015/0037771 A1 | 2/2015 | Kaleal, III et al. |
| 2015/0042468 A1 | 2/2015 | White et al. |
| 2015/0057945 A1 | 2/2015 | White et al. |
| 2015/0094904 A1* | 4/2015 | Bourgeois ............... G06N 5/00 703/8 |
| 2015/0119198 A1 | 4/2015 | Wisbey et al. |
| 2015/0119728 A1 | 4/2015 | Blackadar et al. |
| 2015/0141873 A1 | 5/2015 | Fei |
| 2015/0160026 A1 | 6/2015 | Kitchel |
| 2015/0180842 A1 | 6/2015 | Panther |
| 2015/0185815 A1 | 7/2015 | Debates et al. |
| 2015/0209615 A1 | 7/2015 | Edwards |
| 2015/0272483 A1 | 10/2015 | Etemad et al. |
| 2015/0326709 A1 | 11/2015 | Pennanen et al. |
| 2015/0335978 A1 | 11/2015 | Syed et al. |
| 2015/0342533 A1 | 12/2015 | Kelner |
| 2015/0347983 A1 | 12/2015 | Jon et al. |
| 2015/0350822 A1 | 12/2015 | Xiao et al. |
| 2015/0362519 A1 | 12/2015 | Balakrishnan et al. |
| 2015/0374279 A1 | 12/2015 | Takakura et al. |
| 2015/0382150 A1 | 12/2015 | Ansermet et al. |
| 2016/0023043 A1 | 1/2016 | Grundy |
| 2016/0026236 A1 | 1/2016 | Vasistha et al. |
| 2016/0034133 A1 | 2/2016 | Wilson et al. |
| 2016/0041593 A1 | 2/2016 | Dharawat |
| 2016/0058367 A1 | 3/2016 | Raghuram et al. |
| 2016/0058372 A1 | 3/2016 | Raghuram et al. |
| 2016/0059079 A1 | 3/2016 | Watterson |
| 2016/0072557 A1* | 3/2016 | Ahola ................. H04W 4/80 455/41.1 |
| 2016/0081028 A1 | 3/2016 | Chang et al. |
| 2016/0081625 A1 | 3/2016 | Kim et al. |
| 2016/0084869 A1 | 3/2016 | Yuen et al. |
| 2016/0091980 A1 | 3/2016 | Baranski et al. |
| 2016/0104377 A1 | 4/2016 | French et al. |
| 2016/0143579 A1 | 5/2016 | Martikka et al. |
| 2016/0144236 A1 | 5/2016 | Ko et al. |
| 2016/0148396 A1 | 5/2016 | Bayne et al. |
| 2016/0148615 A1 | 5/2016 | Lee et al. |
| 2016/0184686 A1 | 6/2016 | Sampathkumaran |

(56) References Cited

U.S. PATENT DOCUMENTS

| | | |
|---|---|---|
| 2016/0226945 A1 | 8/2016 | Granqvist et al. |
| 2016/0317097 A1 | 11/2016 | Adams et al. |
| 2016/0327915 A1 | 11/2016 | Katzer et al. |
| 2016/0328991 A1 | 11/2016 | Simpson et al. |
| 2016/0346611 A1 | 12/2016 | Rowley et al. |
| 2016/0374566 A1 | 12/2016 | Fung et al. |
| 2017/0010677 A1 | 1/2017 | Roh et al. |
| 2017/0011089 A1 | 1/2017 | Bermudez et al. |
| 2017/0032256 A1 | 2/2017 | Otto et al. |
| 2017/0038740 A1 | 2/2017 | Knappe et al. |
| 2017/0063475 A1 | 3/2017 | Feng |
| 2017/0065230 A1 | 3/2017 | Sinha et al. |
| 2017/0087431 A1 | 3/2017 | Syed et al. |
| 2017/0124517 A1 | 5/2017 | Martin |
| 2017/0153693 A1 | 6/2017 | Duale et al. |
| 2017/0154270 A1 | 6/2017 | Lindman et al. |
| 2017/0168555 A1 | 6/2017 | Munoz et al. |
| 2017/0173391 A1 | 6/2017 | Wiebe et al. |
| 2017/0232294 A1 | 8/2017 | Kruger et al. |
| 2017/0262699 A1 | 9/2017 | White et al. |
| 2017/0266494 A1 | 9/2017 | Crankson et al. |
| 2017/0316182 A1 | 11/2017 | Blackadar et al. |
| 2018/0015329 A1 | 1/2018 | Burich et al. |
| 2018/0193695 A1 | 7/2018 | Lee |
| 2018/0345077 A1 | 12/2018 | Blahnik et al. |

FOREIGN PATENT DOCUMENTS

| | | |
|---|---|---|
| CN | 101713660 A | 5/2010 |
| CN | 102495756 A | 6/2012 |
| CN | 103631359 A | 3/2014 |
| CN | 106062661 A | 10/2016 |
| CN | 106465056 A | 2/2017 |
| CN | 106604369 A | 4/2017 |
| CN | 107391604 A | 11/2017 |
| CN | 108052272 A | 5/2018 |
| CN | 103154954 B | 6/2018 |
| CN | 108377264 A | 8/2018 |
| CN | 108983873 A | 12/2018 |
| EP | 1755098 A2 | 2/2007 |
| EP | 2096820 A1 | 9/2009 |
| EP | 2107837 A1 | 10/2009 |
| EP | 2172249 A2 | 4/2010 |
| EP | 2770454 A1 | 8/2014 |
| EP | 2703945 A2 | 3/2015 |
| EP | 2849473 A1 | 3/2015 |
| EP | 2910901 A1 | 8/2015 |
| EP | 3023859 A1 | 5/2016 |
| FI | 126911 B | 2/2017 |
| GB | 2513585 A | 11/2014 |
| GB | 2530196 A | 3/2016 |
| GB | 2537423 A | 10/2016 |
| GB | 2541234 A | 2/2017 |
| GB | 2555107 A | 4/2018 |
| KR | 20110070049 A | 6/2011 |
| KR | 101500662 B1 | 3/2015 |
| SE | 528295 C2 | 10/2006 |
| TW | 201706840 A | 2/2017 |
| TW | I598076 A | 9/2018 |
| WO | WO02054157 A1 | 7/2002 |
| WO | WO2010083562 A1 | 7/2010 |
| WO | WO2010144720 A1 | 12/2010 |
| WO | WO2011061412 A1 | 5/2011 |
| WO | WO2011123932 A1 | 10/2011 |
| WO | WO2012037637 A1 | 3/2012 |
| WO | WO2012115943 A1 | 8/2012 |
| WO | WO2012141827 A2 | 10/2012 |
| WO | WO2013091135 A1 | 6/2013 |
| WO | WO2013121325 A2 | 8/2013 |
| WO | WO2014118767 A1 | 8/2014 |
| WO | WO2014144258 A2 | 9/2014 |
| WO | WO2014193672 A1 | 12/2014 |
| WO | WO2014209697 A1 | 12/2014 |
| WO | WO2014182162 A3 | 6/2015 |
| WO | WO2015087164 A1 | 6/2015 |
| WO | WO2015131065 A1 | 9/2015 |
| WO | WO2016022203 A1 | 2/2016 |
| WO | WO2017011818 A1 | 1/2017 |
| WO | WO2018217348 A1 | 11/2018 |
| WO | WO2018222936 A1 | 12/2018 |

OTHER PUBLICATIONS

ARM big. LITTLE. Wikipedia, The free encyclopedia, Oct. 11, 2018, Retrieved on May 28, 2020 from: <https://en.wikipedia.org/w/index.php?title=ARM_bit.LITTLE&oldid=863559211> foreword on p. 1, section "Run-state migration" on pp. 1-2.

Qualcomm Snapdragon Wear 3100 Platform Supports New Ultra-Low Power System Architecture For Next Generation Smartwatches. Qualcomm Technologies, Inc., Sep. 10, 2018, Retrieved on May 28, 2020 from: <https://www.qualcomm.com/news/releases/2018/09/10/qualcomm-snapdragon-wear-3100-platform-supports-new-ultra-low-power-system> sections "Snapdragon Wear 3100 Based Smartwatches Aim to Enrich the User Experience" on pp. 3-4.

CNET: Dec. 11, 2017, "Apple watch can now sync with a treadmill", youtube.com, [online], Available from: https://www.youtube.com/watch?v=7RvMC3wFDME [Accessed Nov. 19, 2020].

* cited by examiner

EMBEDDED COMPUTING DEVICE

RELATED APPLICATIONS

This application is a Continuation-in-Part of U.S. patent application Ser. No. 15/784,234 filed on Oct. 16, 2017, which claims priority to both Finnish Patent Application No. 20165790 filed on Oct. 17, 2016 and British Patent Application No. 1617575.4 filed on Oct. 17, 2016.

FIELD OF INVENTION

The present invention in general relates, for example, to implementing multi-core or multi-chip embedded solutions.

BACKGROUND OF INVENTION

Embedded devices generally comprise objects that contain an embedded computing system, which may be enclosed by the object. The embedded computer system may be designed with a specific use in mind, or the embedded computer system may be at least in part general-purpose in the sense that a user may be enabled to install software in it. An embedded computer system may be based on a microcontroller or microprocessor CPU, for example.

Embedded devices may comprise one or more processors, user interfaces and displays, such that a user may interact with the device using the user interface. The user interface may comprise buttons, for example. An embedded device may comprise a connectivity function configured to communicate with a communications network, such as, for example, a wireless communications network. The embedded device may be enabled to receive from such a communications network information relating to, for example, a current time and current time zone.

More complex embedded devices, such as cellular telephones, may allow a user to install applications into a memory, such as, for example, a solid-state memory, comprised in the device. Embedded devices are frequently resource-constrained when compared to desktop or laptop computers. For example, memory capacity may be more limited than in desktop or laptop computers, processor computational capacity may be lower and energy may be available from a battery. The battery, which may be small, may be rechargeable.

Conserving battery power is a key task in designing embedded devices. A lower current usage enables longer time intervals in-between battery charging. For example, smartphones benefit greatly when they can survive an entire day before needing recharging, since users are thereby enabled to recharge their phones overnight, and enjoy uninterrupted use during the day.

Battery resources may be conserved by throttling a processor clock frequency between a maximum clock frequency and a lower clock frequency, for example one half of the maximum clock frequency. Another way to conserve battery power is to cause a display of an embedded device to switch itself off then the device is not used, since displaying content on a display consumes energy in order to cause the display to emit light that humans can see.

SUMMARY OF THE INVENTION

The invention is defined by the features of the independent claims. Some specific embodiments are defined in the dependent claims.

According to a first aspect of the present invention, there is provided an apparatus comprising a first processing core configured to generate first control signals and to control a display by providing the first control signals to the display via a first display interface, a second processing core configured to generate second control signals and to control the display by providing the second control signals to the display via a second display interface, and the first processing core being further configured to cause the second processing core to enter and leave a hibernation state based at least partly on a determination, by the first processing core, concerning an instruction from outside the apparatus.

Various embodiments of the first aspect may comprise at least one feature from the following bulleted list:
- the apparatus is configured to obtain microphone data internally in the apparatus from a microphone comprised in the apparatus
- the second processing core is electrically interfaced with at least one of: cellular communication circuitry, non-cellular wireless communication circuitry and a second wired communications port
- the first processing core and the second processing core are both electrically interfaced with a shared random access memory
- the first processing core is configured to cause the second processing core to leave the hibernation state responsive to a determination that a a preconfigured spoken instruction has been recorded in the microphone data, the instruction from outside the apparatus comprising the preconfigured spoken instruction
- the first processing core is configured to cause the second processing core to leave the hibernation state responsive to a determination that a a preconfigured auditory control signal has been recorded in the microphone data, the instruction from outside the apparatus comprising the preconfigured auditory control signal
- the first processing core is configured to cause the second processing core to leave the hibernation state responsive to a determination that a notification is received in the apparatus, the notification requiring a capability of the second processing core, the instruction from outside the apparatus comprising the notification
- the second graphics mode comprises a reduced map view graphics mode
- the first processing core is configured to cause the second processing core to enter the hibernation state responsive to a determination that a user interface type not supported by the first processing core is no longer requested
- the apparatus comprises the display, the display having a first electrical connection to the first display interface in the first processing core and a second electrical connection to the second display interface in the second processing core
- the first processing core and the second processing core are comprised in a same integrated circuit
- the first processing core is comprised in a microcontroller and the second processing core is comprised in a microprocessor, the microcontroller being external to the microprocessor and the microprocessor being external to the microcontroller
- the apparatus is configured to store, at least in part, a context of the second processing core in connection with transitioning the second processing core into the hibernation state.

According to a second aspect of the present invention, there is provided a method in an apparatus, comprising generating, by a first processing core, first control signals, controlling a display by providing the first control signals to the display via a first display interface, generating, by a second processing core, second control signals, controlling the display by providing the second control signals to the display via a second display interface, and causing the second processing core to enter and leave a hibernation state based at least partly on a determination, by the first processing core, concerning an instruction from outside the apparatus.

Various embodiments of the first aspect may comprise at least one feature from the following bulleted list:

- obtaining microphone data internally in the apparatus from a microphone comprised in the apparatus
- the second processing core is electrically interfaced with at least one of: cellular communication circuitry, non-cellular wireless communication circuitry and a second wired communications port
- the first processing core and the second processing core are both electrically interfaced with a shared random access memory
- the method further comprises causing, by the first processing core, the second processing core to leave the hibernation state responsive to a determination that a a preconfigured spoken instruction has been recorded in the microphone data, the instruction from outside the apparatus comprising the preconfigured spoken instruction
- the method further comprised causing, by the first processing core, the second processing core to leave the hibernation state responsive to a determination that a preconfigured auditory control signal has been recorded in the microphone data, the instruction from outside the apparatus comprising the preconfigured auditory control signal
- the method further comprises causing, by the first processing core, the second processing core to leave the hibernation state responsive to a determination that a notification is received in the apparatus, the notification requiring a capability of the second processing core, the instruction from outside the apparatus comprising the notification
- the second graphics mode comprises a reduced map view graphics mode
- the method further comprises causing, by the first processing core, the second processing core to enter the hibernation state responsive to a determination that a user interface type not supported by the first processing core is no longer requested
- the method is performed in an apparatus comprising the display, the display having a first electrical connection to the first display interface in the first processing core and a second electrical connection to the second display interface in the second processing core
- the first processing core and the second processing core are comprised in a same integrated circuit
- the first processing core is comprised in a microcontroller and the second processing core is comprised in a microprocessor, the microcontroller being external to the microprocessor and the microprocessor being external to the microcontroller.

According to a third aspect of the present invention, there is provided an apparatus comprising at least one processing core and at least one memory including computer program code, the at least one memory and the computer program code being configured to, with the at least one processing core, cause the apparatus at least to generate, by a first processing core, first control signals, control a display by providing the first control signals to the display via a first display interface, generate, by a second processing core, second control signals, control the display by providing the second control signals to the display via a second display interface, and cause the second processing core to enter and leave a hibernation state based at least partly on a determination, by the first processing core, concerning an instruction from outside the apparatus.

According to a fourth aspect of the present invention, there is provided an apparatus comprising means for generating, by a first processing core, first control signals, means for controlling a display by providing the first control signals to the display via a first display interface, means for generating, by a second processing core, second control signals, means for controlling the display by providing the second control signals to the display via a second display interface, and means for causing the second processing core to enter and leave a hibernation state based at least partly on a determination, by the first processing core, concerning microphone data.

According to a fifth aspect of the present invention, there is provided a non-transitory computer readable non-transitory medium having stored thereon a set of computer readable instructions that, when executed by at least one processor, cause an apparatus to at least generate, by a first processing core, first control signals, control a display by providing the first control signals to the display via a first display interface, generate, by a second processing core, second control signals, control the display by providing the second control signals to the display via a second display interface, and cause the second processing core to enter and leave a hibernation state based at least partly on a determination, by the first processing core, concerning an instruction from outside the apparatus.

According to a sixth aspect of the present invention, there is provided a computer program configured to cause a method in accordance with the second aspect to be performed, when run.

INDUSTRIAL APPLICABILITY

At least some embodiments of the present invention find industrial application in embedded multi-chip or multi-core and power usage optimization thereof.

DETAILED DESCRIPTION OF EXAMPLE EMBODIMENTS

Furnishing an embedded device with two or more processor cores, at least some of which are enabled to control the display of the device, makes possible power savings where a less-capable processor core is configured to toggle a more capable processor core to and from a hibernation state. A hibernation state may comprise that a clock frequency of the more capable processing core is set to zero, for example. In a hibernation state, in addition to, or alternatively to, setting the clock frequency of the more capable processing core to zero, a memory refresh rate of memory used by the more capable core may be set to zero. Alternatively to zero, a low non-zero frequency may be used for the clock frequency and/or the memory refresh frequency. In some embodiments, a more capable processing core may employ a higher-density memory technology, such as double data rate, DDR, memory, and a less capable processing core may employ a lower-density memory technology, such as static random access memory, SRAM, memory. In a hibernation state the hibernated processing core, or more generally processing unit, may be powered off. Alternatively to a processor core, an entire processor may, in some embodiments, be transitioned to a hibernation state. An advantage of hibernating an entire processor is that circuitry in the processor outside the core is also hibernated, further reducing current consumption.

Figure 1:
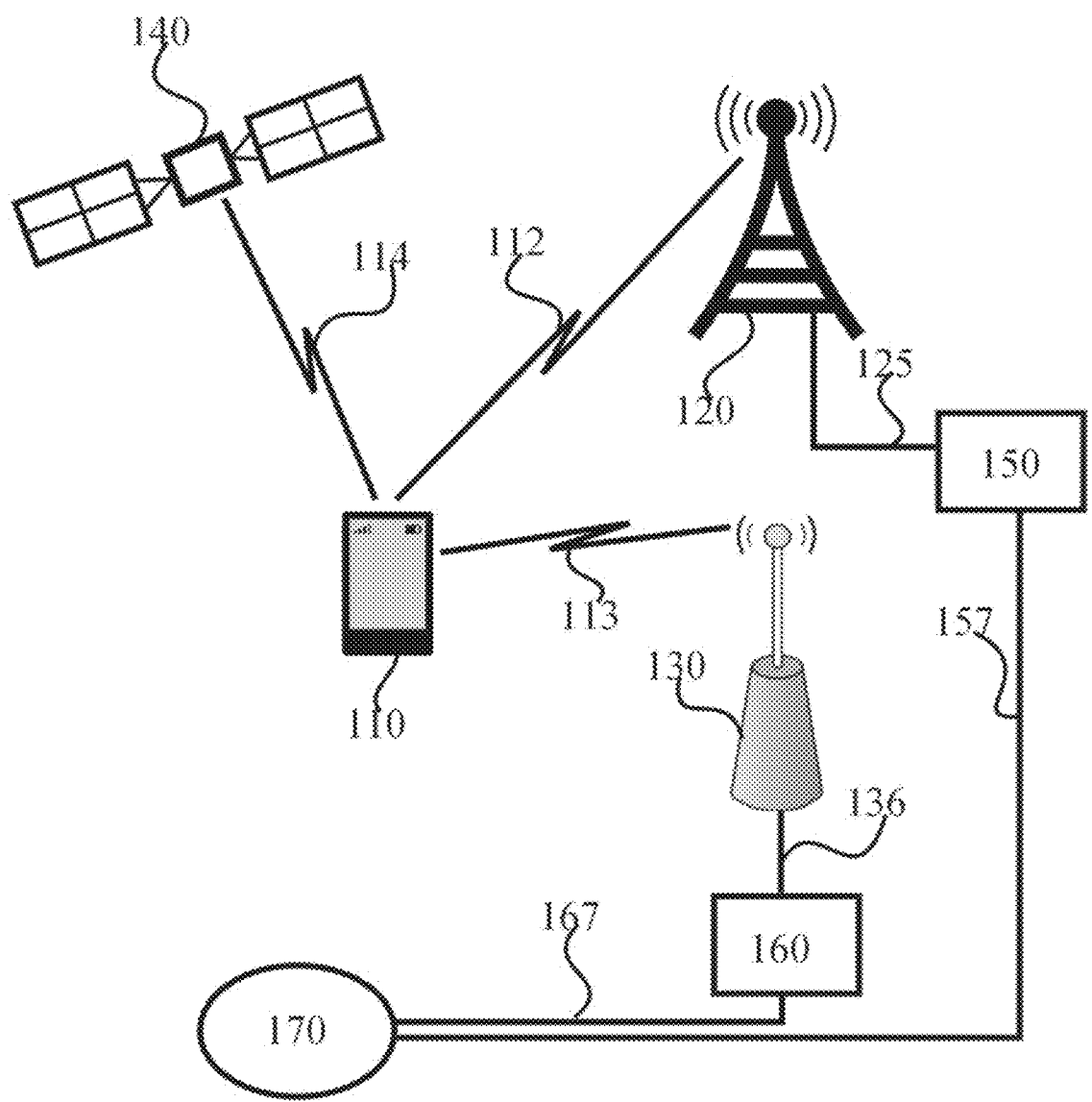
FIG. 1 illustrates an example system capable of supporting at least some embodiments of the present invention.

FIG. 1 illustrates an example system capable of supporting at least some embodiments of the present invention. In the example system of FIG. 1 is comprised device 110, which may comprise an embedded device, such as for example a smart watch, personal health monitor, cellular phone, smartphone or other suitable device.

Device 110 is in the example of FIG. 1 configured with a plurality of communication interfaces. A first communication interface enables device 110 to receive satellite positioning information from satellite constellation 140, via satellite link 114. Examples of suitable satellite positioning constellations include global positioning system, GPS, GLONASS, Beidou and the Galileo satellite positioning constellation.

A second communications interface enables device 110 to communicate with a cellular communications system, such as for example a wideband code division multiple access, WCDMA, or long term evolution, LTE, network. A cellular link 112 may be configured to convey information between device 110 and base station 120. The cellular link 112 may be configured in accordance with the same cellular communications standard that both device 110 and base station 120 both support. Base station 120 may be comprised in a cellular radio access network that comprises a plurality of base stations. Base station 120 may be arranged to communicate with core network node 150 via connection 125. Core network node 150 may comprise a switch, mobility management entity or gateway, for example. Core network node 150 may be arranged to communicate with a further network 170, such as for example the Internet, via connection 157.

A third communications interface enables device 110 to communicate with a non-cellular communications system, such as for example a wireless local area network, WLAN, Bluetooth or worldwide interoperability for microwave access, WiMAX, system. A further example is an inductive underwater communication interface. A non-cellular link 113 may be configured to convey information between device 110 and access point 130. The non-cellular link 113 may be configured in accordance with the same non-cellular technology that both device 110 and access point 130 both support. Access point 130 may be arranged to communicate with gateway 160 via connection 136. Gateway 160 may be arranged to communicate with further network 170 via connection 167. Each of connections 125, 157, 136 and 167 may be wire-line or at least in part wireless. Not all of these connections need to be of the same type. In certain embodiments, at least one of the first communications interface, the second communications interface and the third communications interface is absent.

A fourth communications link may enable device 110 to communicate with a mobile device. For example, a low-power wireless interface may enable communication with a mobile device where device 110 lacks cellular capability and a mobile device distinct from device 110 has cellular capability. An example of a low-power wireless interface is Bluetooth-low energy, BLE, or Bluetooth Smart.

In use, device 110 may use satellite positioning information from satellite constellation 140 to determine a geo-location of device 110. The geo-location may be determined in terms of coordinates, for example. Device 110 may be configured to present, on a display that may be comprised in device 110, a map with the determined geo-location of device 110 presented thereon. For example, device 110 may display a street or feature map of the surroundings, with a symbol denoting the current location of device 110 on the map. Providing a map with a current location of device 110 indicated thereon, and/or providing navigation instructions, may be referred to as a mapping service.

In some embodiments, device 110 may provide connectivity services to a user, such as for example web browsing, instant messaging and/or email. Device 110 may be configured to provide connectivity service to its functions and/or applications, in some embodiments including enabling remote access to these functions and/or services over a network, such as the Internet. Thus device 110 may be trackable over the Internet, for example. Such connectivity services may be run over bidirectional communication links, such as for example cellular link 112 and/or non-cellular link 113. In general, device 110 may provide a service, such as for example a mapping service or a connectivity service, to a user via a display.

Device 110 may comprise two or more processing units. The two or more processing units may each comprise a processing core. Each processing unit may comprise one or multiple uniformal or heterogeneous processor cores and/or different volatile and non-volatile memories. For example, device 110 may comprise a microprocessor with at least one processing core, and a microcontroller with at least one processing core. The processing cores needn't be of the same type, for example, a processing core in a microcontroller may have more limited processing capability and/or a less capable memory technology than a processing core comprised in a microprocessor. In some embodiments, a single integrated circuit comprises two processing cores, a first one of which has lesser processing capability and consumes less power, and a second one of which has greater processing capability and consumes more power. In general a first one of the two processing units may have lesser processing capability and consume less power, and a second one of the two processing units may have greater processing capability and consume more power. Each of the processing units may be enabled to control the display of device 110. The more capable processing unit may be configured to provide a richer visual experience via the display. The less capable processing unit may be configured to provide a reduced visual experience via the display. An example of a reduced visual experience is a reduced colour display mode, as opposed to a rich colour display mode. An another example of a reduced visual experience is one which is black-and-white. An example of a richer visual experience is one which uses colours. Colours may be represented with 16 bits or 24 bits, for example.

Each of the two processing units may comprise a display interface configured to communicate toward the display. For example, where the processing units comprise a microprocessor and a microcontroller, the microprocessor may comprise transceiver circuitry coupled to at least one metallic pin under the microprocessor, the at least one metallic pin being electrically coupled to an input interface of a display control device. The display control device, which may be comprised in the display, is configured to cause the display to display information in dependence of electrical signals received in the display control device. Likewise the microcontroller in this example may comprise transceiver circuitry coupled to at least one metallic pin under the microcontroller, the at least one metallic pin being electrically coupled to an input interface of a display control device. The display control device may comprise two input interfaces, one coupled to each of the two processing units, or alternatively the display control device may comprise a single input interface into which both processing units are enabled to provide inputs via their respective display interfaces. Thus a display interface in a processing unit may comprise transceiver circuitry enabling the processing unit to transmit electrical signals toward the display.

One of the processing units, for example the less capable or the more capable one, may be configured to control, at least in part, the other processing unit. For example, the less capable processing unit, for example a less capable processing core, may be enabled to cause the more capable processing unit, for example a more capable processing core, to transition into and from a hibernating state. These transitions may be caused to occur by signalling via an inter-processing unit interface, such as for example an inter-core interface.

When transitioning into a hibernating state from an active state, the transitioning processing unit may store its context, at least in part, into a memory, such as for example a pseudostatic random access memory, PSRAM, SRAM, FLASH or ferroelectric RAM, FRAM. The context may comprise, for example, content of registers and/or addressing. When transitioning from a hibernated state using a context stored in memory, a processing unit may resume processing faster and/or from a position where the processing unit was when it was hibernated. This way, a delay experienced by a user may be minimised. Alternative terms occasionally used for context include state and image. In a hibernating state, a clock frequency of the processing unit and/or an associated memory may be set to zero, meaning the processing unit is powered off and does not consume energy. Circuitry configured to provide an operating voltage to at least one processing unit may comprise a power management integrated circuit, PMIC, for example. Since device 110 comprises another processing unit, the hibernated processing unit may be powered completely off while maintaining usability of device 110.

When transitioning from a hibernated state to an active state, the transitioning processing unit may have its clock frequency set to a non-zero value. The transitioning processing unit may read a context from a memory, wherein the context may comprise a previously stored context, for example a context stored in connection with transitioning into the hibernated state, or the context may comprise a default state or context of the processing unit stored into the memory in the factory. The memory may comprise pseudostatic random access memory, SRAM, FLASH and/or FRAM, for example. The memory used by the processing unit transitioning to and from the hibernated state may comprise DDR memory, for example.

With one processing unit in a hibernation state, the non-hibernated processing unit may control device 110. For example, the non-hibernated processing unit may control the display via the display interface comprised in the non-hibernated processing unit. For example, where a less capable processing unit has caused a more capable processing unit to transition to the hibernated state, the less capable processing unit may provide a reduced user experience, for example, via at least in part, the display. An example of a reduced user experience is a mapping experience with a reduced visual experience comprising a black-and-white rendering of the mapping service. The reduced experience may be sufficient for the user to obtain a benefit from it, with the advantage that battery power is conserved by hibernating the more capable processing unit. In some embodiments, a more capable processing unit, such as a microprocessor, may consume a milliampere of current when in a non-hibernated low-power state, while a less capable processing unit, such as a microcontroller, may consume only a microampere when in a non-hibernated low-power state. In non-hibernated states current consumption of processing units may be modified by setting an operating clock frequency to a value between a maximum clock frequency and a minimum non-zero clock frequency. In at least some embodiments, processing units, for example less capable processing units, may be configurable to power down for short periods, such as 10 or 15 microseconds, before being awakened. In the context of this document, this is not referred to as a hibernated state but an active low-power configuration. An average clock frequency calculated over a few such periods and the intervening active periods is a positive non-zero value. A more capable processing unit may be enabled to run the Android operating system, for example.

Triggering events for causing a processing unit to transition to the hibernated state include a user indicating a non-reduced experience is no longer needed, a communication interface of the processing unit no longer being needed and device 110 not having been used for a predetermined length of time. An example indication that a non-reduced experience is no longer needed is where the user deactivates a full version of an application, such as for example a mapping application. Triggering events for causing a processing unit to transition from the hibernated state to an active state may include a user indicating a non-reduced experience is needed, a communication interface of the processing unit being requested and device 110 being interacted with after a period of inactivity. Alternatively or additionally, external events may be configured as triggering events, such as, for example, events based on sensors comprised in device 110. An example of such an external event is a clock-based event which is configured to occur at a preconfigured time of day, such as an alarm clock function, for example. In at least some embodiments, the non-reduced experience comprises use of a graphics mode the non-hibernated processing unit cannot support, but the hibernated processing unit can support. A graphics mode may comprise a combination of a resolution, colour depth and/or refresh rate, for example.

In some embodiments, a user need or user request for the non-reduced experience may be predicted. Such predicting may be based at least in part on a usage pattern of the user, where the user has tended to perform a certain action in the reduced experience before requesting the non-reduced experience. In this case, responsive to a determination the user performs the certain action in the reduced experience, the non-reduced mode may be triggered.

If the processing units reside in separate devices or housings, such as a wrist-top computer and a handheld or fixedly mounted display device for example, a bus may be implemented in a wireless fashion by using a wireless communication protocol. Radio transceiver units functionally connected to their respective processing units may thus perform the function of the bus, forming a personal area network, PAN. The wireless communication protocol may be one used for communication between computers, and/or between any remote sensors, such as a Bluetooth LE or the proprietary ANT+ protocol. These are using direct-sequence spread spectrum, DSSS, modulation techniques and an adaptive isochronous network configuration, respectively. Enabling descriptions of necessary hardware for various implementations for wireless links are available, for example, from the Texas Instrument®'s handbook "Wireless Connectivity" which includes IC circuits and related hardware configurations for protocols working in sub-1- and 2.4-GHz frequency bands, such as ANT™, Bluetooth®, Bluetooth® low energy, RFID/NFC, PurePath™ Wireless audio, ZigBee®, IEEE 802.15.4, ZigBee RF4CE, 6LoW-PAN, Wi-Fi®.

In connection with hibernation, the PAN may be kept in operation by the non-hibernated processing unit, such that when hibernation ends, the processing unit leaving the hibernated mode may have access to the PAN without needing to re-establish it.

In some embodiments, microphone data is used in determining, in a first processor, whether to trigger a second processor from hibernation. The first processor may be less capable and consume less energy than the second processor. The first processor may comprise a microcontroller and the second processor may comprise a microprocessor, for example. The microphone data may be compared to reference data and/or preprocessed to identify in the microphone data features enabling determination whether a spoken instructions has been uttered and recorded into the microphone data. Alternatively or in addition to a spoken instruction, an auditory control signal, such as a fire alarm or beep signal, may be searched in the microphone data.

Responsive to the spoken instruction and/or auditory control signal being detected, by the first processor, in the microphone data, the first processor may start the second processor. In some embodiments, the first processor starts the second processor into a state that the first processor selects in dependence of which spoken instruction and/or auditory control signal was in the microphone data. Thus, for example, where the spoken instruction identifies a web search engine, the second processor may be started up into a user interface of this particular web search engine. As a further example, where the auditory control signal is a fire alarm, the second processor may be started into a user interface of an application that provides emergency guidance to the user. Selecting the initial state for the second processor already in the first processor saves time compared to the case where the user or second processor itself selects the state.

In cases where a microphone is comprised in the apparatus, the microphone may in particular be enclosed inside a waterproof casing. While such a casing may prevent high-quality microphone data from being generated, it may allow for microphone quality to be generated that is of sufficient quality for the first processor to determine, whether the spoken instruction and/or auditory control signal is present.

In some embodiments, the first processor is configured to process a notification that arrives in the apparatus, and to decide whether the second processor is needed to handle the notification. The notification may relate to a multimedia message or incoming video call, for example. The notification may relate to a software update presented to the apparatus, wherein the first processor may cause the second processor to leave the hibernating state to handle the notification. The first processor may select, in dependence of the notification, an initial state into which the second processor starts from the hibernated state. For a duration of a software update, the second processor may cause the first processor to transition into a hibernated state.

In general, an instruction from outside the apparatus may be received in the apparatus, and the first processor may responsively cause the second processor to leave the hibernation state. The instruction from outside the apparatus may comprise, for example, the notification, the spoken instruction or the auditory control signal.

Figure 2:
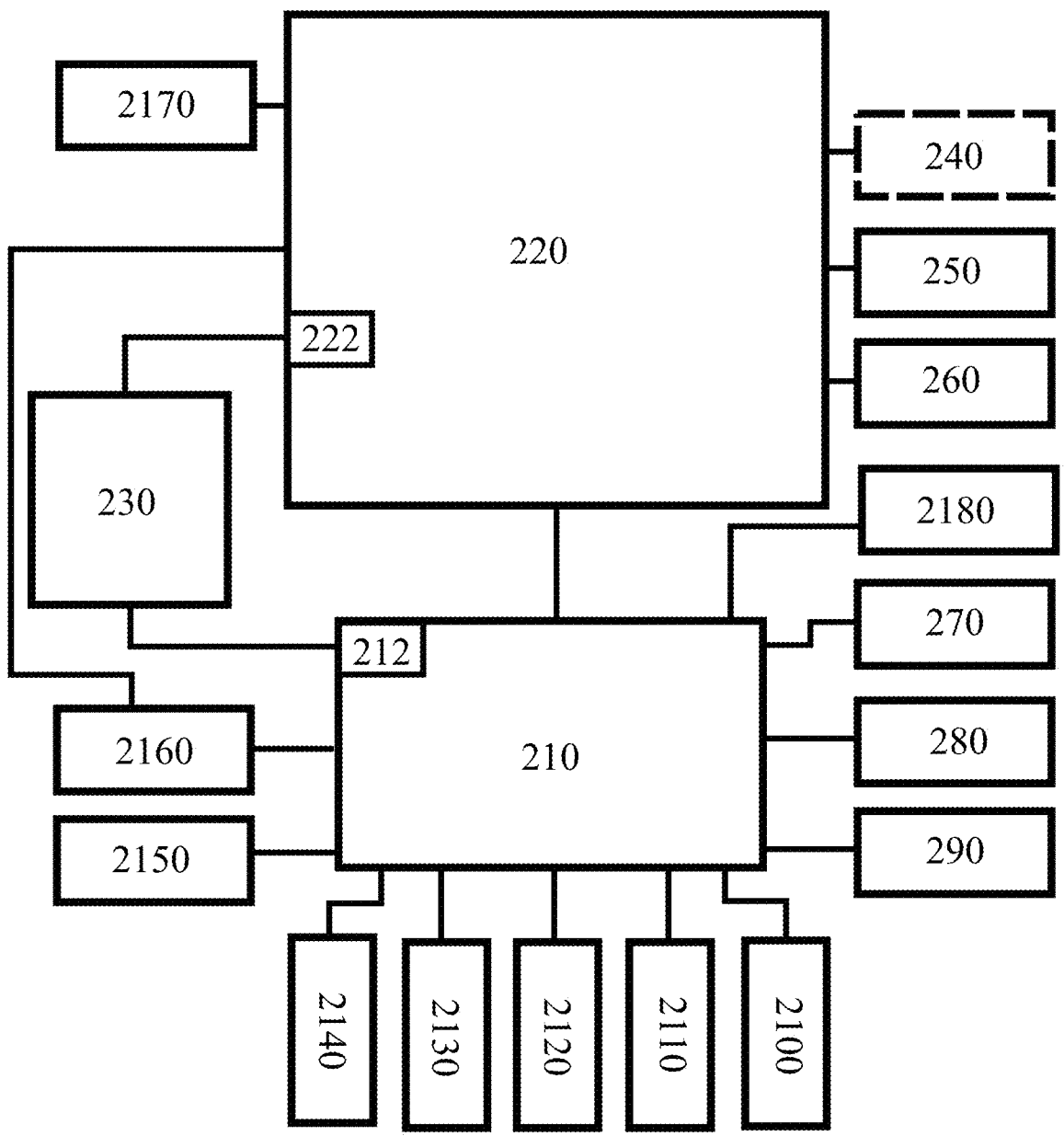
FIG. 2 illustrates a first example apparatus capable of supporting at least some embodiments of the present invention.

FIG. 2 illustrates a first example apparatus capable of supporting at least some embodiments of the present invention. The illustrated apparatus comprises a microcontroller 210 and a microprocessor 220. Microcontroller 210 may comprise, for example, a Silabs EMF32 or a Renesas RL78 microcontroller, or similar. Microprocessor 220 may comprise, for example, a Qualcomm Snapdragon processor or an ARM Cortex-based processor. Microcontroller 210 and microprocessor 220 are in the example of FIG. 2 communicatively coupled with an inter-core interface, which may comprise, for example, a serial or a parallel communication interface. More generally an interface disposed between microcontroller 210 and microprocessor 220 may be considered an inter-processing unit interface.

Microcontroller 210 is communicatively coupled, in the illustrated example, with a buzzer 270, a universal serial bus, USB, interface 280, a pressure sensor 290, an acceleration sensor 2100, a gyroscope 2110, a magnetometer 2120, satellite positioning circuitry 2130, a Bluetooth interface 2140, user interface buttons 2150 and a touch interface 2160. Pressure sensor 290 may comprise an atmospheric pressure sensor, for example.

Microprocessor 220 is communicatively coupled with an optional cellular interface 240, a non-cellular interface 250 and a USB interface 260. Microprocessor 220 is further communicatively coupled, via microprocessor display interface 222, with display 230. Microcontroller 210 is likewise communicatively coupled, via microcontroller display interface 212, with display 230. Microprocessor display interface 222 may comprise communication circuitry comprised in microprocessor 220. Microcontroller display interface 212 may comprise communication circuitry comprised in microcontroller 210.

Microcontroller 210 may be configured to determine whether triggering events occur, wherein responsive to the triggering events microcontroller 210 may be configured to cause microprocessor 220 to transition into and out of the hibernating state described above. When microprocessor 220 is in the hibernating state, microcontroller 210 may control display 230 via microcontroller display interface 222. Microcontroller 210 may thus provide, when microprocessor 220 is hibernated, for example, a reduced experience to a user via display 230.

Responsive to a triggering event, microcontroller 210 may cause microprocessor 220 to transition from the hibernated state to an active state. For example, where a user indicates, for example via buttons 2150, that he wishes to originate a cellular communication connection, microcontroller 210 may cause microprocessor 220 to transition to an active state since cellular interface 240 is controllable by microprocessor 220, but, in the example of FIG. 2, not directly usable by microcontroller 210. In some embodiments, when microprocessor 220 is hibernated, also cellular interface 240 is in a hibernated state. Cellular interface 240 may comprise an electrical interface to a cellular transceiver, for example. Cellular interface 240 may comprise control circuitry of a cellular transceiver.

In various embodiments, at least two elements illustrated in FIG. 2 may be integrated on a same integrated circuit. For example, microprocessor 220 and microcontroller 210 may be disposed as processing cores in a same integrated circuit. Where this is the case, for example, cellular interface 240 may be a cellular interface of this integrated circuit, comprised in this integrated circuit, with cellular interface 240 being controllable by microprocessor 220 but not by microcontroller 210. In other words, individual hardware features of the integrated circuit may be controllable by one of microcontroller 210 and microprocessor 220, but not both. On the other hand, some hardware features may be controllable by either processing unit. For example, USB interface 260 and USB interface 280 may be in such an integrated embodiment one and the same USB interface of the integrated circuit, controllable by either processing core.

In FIG. 2 are further illustrated memory 2170 and memory 2180. Memory 2170 is used by microprocessor 220, and may be based on a DDR memory technology, such as for example DDR2 or DDR3, for example. Memory 2180 is used by microcontroller 210, and may be based on SRAM technology, for example.

Figure 3:
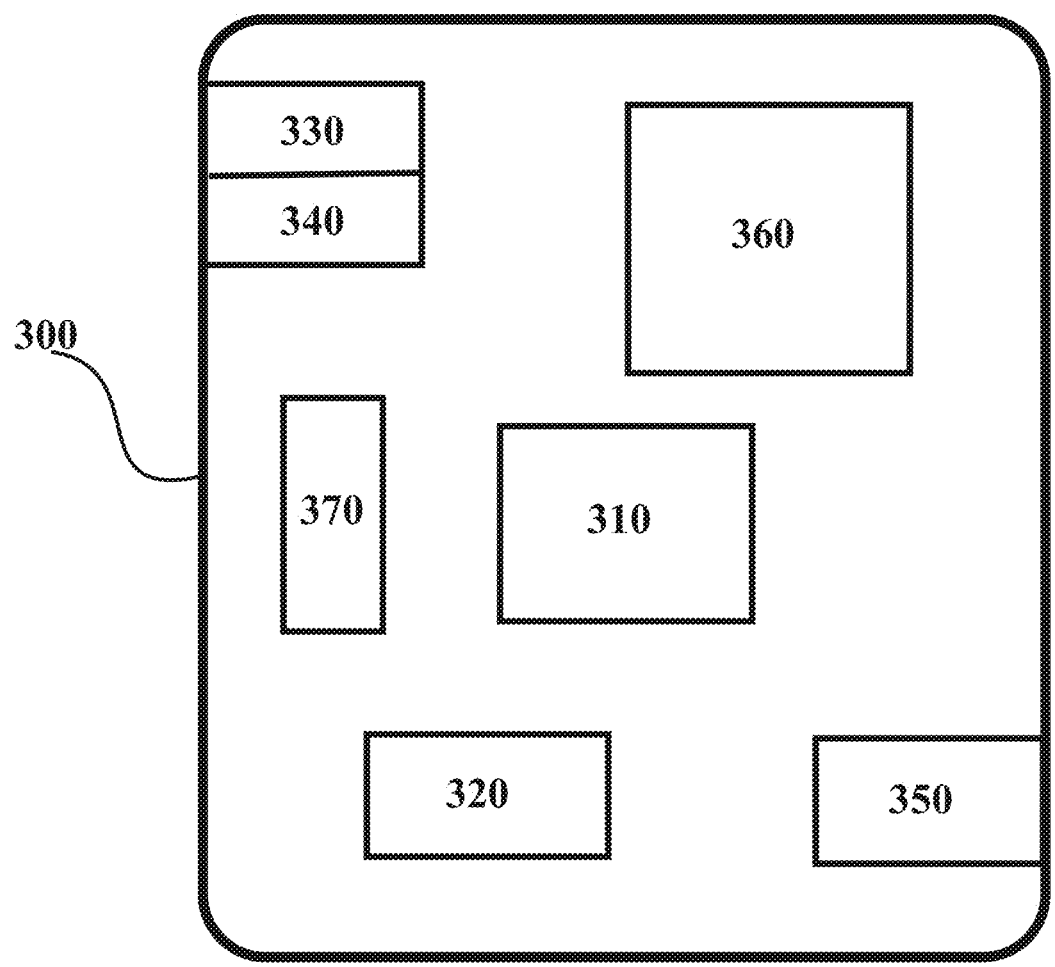
FIG. 3 illustrates a second example apparatus capable of supporting at least some embodiments of the present invention.

FIG. 3 illustrates a second example apparatus capable of supporting at least some embodiments of the present invention.

Illustrated is device 300, which may comprise, for example, an embedded device 110 of FIG. 1. Comprised in device 300 is processor 310, which may comprise, for example, a single- or multi-core processor wherein a single-core processor comprises one processing core and a multi-core processor comprises more than one processing core. Processor 310 may correspond to the structure illustrated in FIG. 2, with the exception of display 230, for example. Processor 310 may comprise more than one processor or processing unit. Processor 310 may comprise at least one application-specific integrated circuit, ASIC. Processor 310 may comprise at least one field-programmable gate array, FPGA. Processor 310 may be means for performing method steps in device 300. Processor 310 may be configured, at least in part by computer instructions, to perform actions.

Device 300 may comprise memory 320. Memory 320 may comprise random-access memory and/or permanent memory. Memory 320 may comprise volatile and/or non-volatile memory. Memory 320 may comprise at least one RAM chip. Memory 320 may comprise magnetic, optical and/or holographic memory, for example. Memory 320 may be at least in part accessible to processor 310. Memory 320 may be means for storing information. Memory 320 may comprise computer instructions that processor 310 is configured to execute. When computer instructions configured to cause processor 310 to perform certain actions are stored in memory 320, and device 300 overall is configured to run under the direction of processor 310 using computer instructions from memory 320, processor 310 and/or its at least one processing core may be considered to be configured to perform said certain actions. Memory 320 may be at least in part comprised in processor 310. Memory 320 may be at least in part external to device 300 but accessible to device 300.

Device 300 may comprise a transmitter 330. Device 300 may comprise a receiver 340. Transmitter 330 and receiver 340 may be configured to transmit and receive, respectively, information in accordance with at least one cellular or non-cellular standard. Transmitter 330 may comprise more than one transmitter. Receiver 340 may comprise more than one receiver. Transmitter 330 and/or receiver 340 may be configured to operate in accordance with global system for mobile communication, GSM, wideband code division multiple access, WCDMA, long term evolution, LTE, IS-95, wireless local area network, WLAN, Ethernet and/or worldwide interoperability for microwave access, WiMAX, standards, for example. Transmitter 330 and/or receiver 340 may be controllable via cellular interface 240, non-cellular interface 250 and/or USB interface 280 of FIG. 2, for example.

Device 300 may comprise a near-field communication, NFC, transceiver 350. NFC transceiver 350 may support at least one NFC technology, such as NFC, Bluetooth, Wibree or similar technologies.

Device 300 may comprise user interface, UI, 360. UI 360 may comprise at least one of a display, a keyboard, a touchscreen, a vibrator arranged to signal to a user by causing device 300 to vibrate, a speaker and a microphone. User input to UI 360 may be based on patterns, such as, for example, where a user shakes device 300 to initiate actions via UI 360. A user may be able to operate device 300 via UI 360, for example to accept incoming telephone calls, to originate telephone calls or video calls, to browse the Internet, to manage digital files stored in memory 320 or on a cloud accessible via transmitter 330 and receiver 340, or via NFC transceiver 350, and/or to play games. UI 360 may comprise, for example, buttons 2150 and display 230 of FIG. 2.

Device 300 may comprise or be arranged to accept a user identity module 370. User identity module 370 may comprise, for example, a subscriber identity module, SIM, card installable in device 300. A user identity module 370 may comprise information identifying a subscription of a user of device 300. A user identity module 370 may comprise cryptographic information usable to verify the identity of a user of device 300 and/or to facilitate encryption of communicated information and billing of the user of device 300 for communication effected via device 300.

Processor 310 may be furnished with a transmitter arranged to output information from processor 310, via electrical leads internal to device 300, to other devices comprised in device 300. Such a transmitter may comprise a serial bus transmitter arranged to, for example, output information via at least one electrical lead to memory 320 for storage therein. Alternatively to a serial bus, the transmitter may comprise a parallel bus transmitter. Likewise processor 310 may comprise a receiver arranged to receive information in processor 310, via electrical leads internal to device 300, from other devices comprised in device 300. Such a receiver may comprise a serial bus receiver arranged to, for example, receive information via at least one electrical lead from receiver 340 for processing in processor 310. Alternatively to a serial bus, the receiver may comprise a parallel bus receiver.

Device 300 may comprise further devices not illustrated in FIG. 3. For example, where device 300 comprises a smartphone, it may comprise at least one digital camera. Some devices 300 may comprise a back-facing camera and a front-facing camera, wherein the back-facing camera may be intended for digital photography and the front-facing camera for video telephony. Device 300 may comprise a fingerprint sensor arranged to authenticate, at least in part, a user of device 300. In some embodiments, device 300 lacks at least one device described above. For example, some devices 300 may lack a NFC transceiver 350 and/or user identity module 370.

Processor 310, memory 320, transmitter 330, receiver 340, NFC transceiver 350, UI 360 and/or user identity module 370 may be interconnected by electrical leads internal to device 300 in a multitude of different ways. For example, each of the aforementioned devices may be separately connected to a master bus internal to device 300, to allow for the devices to exchange information. However, as the skilled person will appreciate, this is only one example and depending on the embodiment various ways of interconnecting at least two of the aforementioned devices may be selected without departing from the scope of the present invention.

In general, there is provided a diving information apparatus, which comprises first and second processing cores. The first processing core, which may have lower processing capability and lower power usage than the second processing core, may be configured to maintain dive information during a dive. A dive may comprise a dive under water, that is, a period of time when a user is submerged. Having a processing core with a lower power consumption maintain the dive information increases the time the apparatus can maintain the dive information, as the second processing core may be kept, for the most part, in a hibernation state, as will be described herein. The first processing core may control a display, which may be comprised in the diving information apparatus, to display the dive information and/or indications derived from the dive information.

As the dive information may comprise, for example, at least one of a remaining time before ascent toward the surface should begin, decompression data, safety stop data, a remaining amount of air, any possible messages from other divers and depth as a function of time, the dive information is safety critical for a diver. As such, since safety critical information is being handled, a redundant information management system is of interest. Redundancy in the present dive information apparatus is provided by the second processing core, which may be configured to switch from the hibernation state to an active state periodically, for example at constant periods, to verify the dive information is correct. For example, the second processing core may be configured to check gas levels have progressed in a credible fashion during the dive, there are no sudden jumps in diving depth, and the remaining time develops consistently with other aspects of the dive information. In other words, the second processing core may verify the dive information has not become corrupted due to bit errors, memory corruption or bugs in the first processing core. In case the dive information is verified as correct, the second processing core may return to the hibernation state as a response to such verification.

For example, the second processing core may exit the hibernation state every second, every five seconds or even minutes, such as every two minutes, for example. The verification of the dive information may take only a few milliseconds, wherefore the second processing core would remain in the hibernation state for over 90% of the time, saving energy and prolonging the time the diving information apparatus remains usable before its battery needs to be recharged or replaced.

The dive information may be kept in at least one non-volatile memory, as will be discussed herein below in connection with FIG. 4.

The first processing core may be configured to re-boot in case an error occurs, and resume maintaining the dive information from the non-volatile memory. As the memory is non-volatile, it will keep the dive information over the re-boot. In general, the dive information may be stored in the form of plural time series, enabling re-constructing the dive by observing how variables comprised in the dive information develop as a function of time. For example, one time series may be a time series of diving depth values, another time series may be a time series of remaining air values, and so on.

The second processing core may be configured to, as a response to the verifying of the dive information indicating the dive information is corrupt, cause the first processing core to stop maintaining the dive information. This may comprise setting the first processing core into an inactive state. The second processing core may then assume the role of maintaining the dive information for the remainder of the dive. The second processing core may further be configured to attempt to repair the dive information, for example by determining which variable is unreliable, for example due to an unnatural sudden change in its value, and re-obtain that variable from another source. The second processing core may be configured to provide an indication to the diver, of which dive information may have become unreliable. The second processing core may be configured to cease providing to the display any indication of specific variables of the dive information which have been determined to be unreliable or potentially unreliable. This would maintain the benefit that the diver can have confidence in the information he is provided with, and he may abort the dive as safely as possible.

In some embodiments, the second processing core is triggered from the hibernation state to the active state as a response to a determination that ascent toward the surface should begin soon, for example, within one minute or within three minutes. Such a determination may be reached based on the dive information, for example. The reason the second processing core may be started in this situation, is that the second processing core may be capable of presenting to the display a visually more engaging indication that ascent should begin soon. As the first processing core has lower capability, it may only be capable of providing a monochrome and/or slowly updating display mode, whereas the second processing core may be able to provide a more colorful and/or animated display, suitable for conveying a warning that catches the attention of the user.

Figure 4:
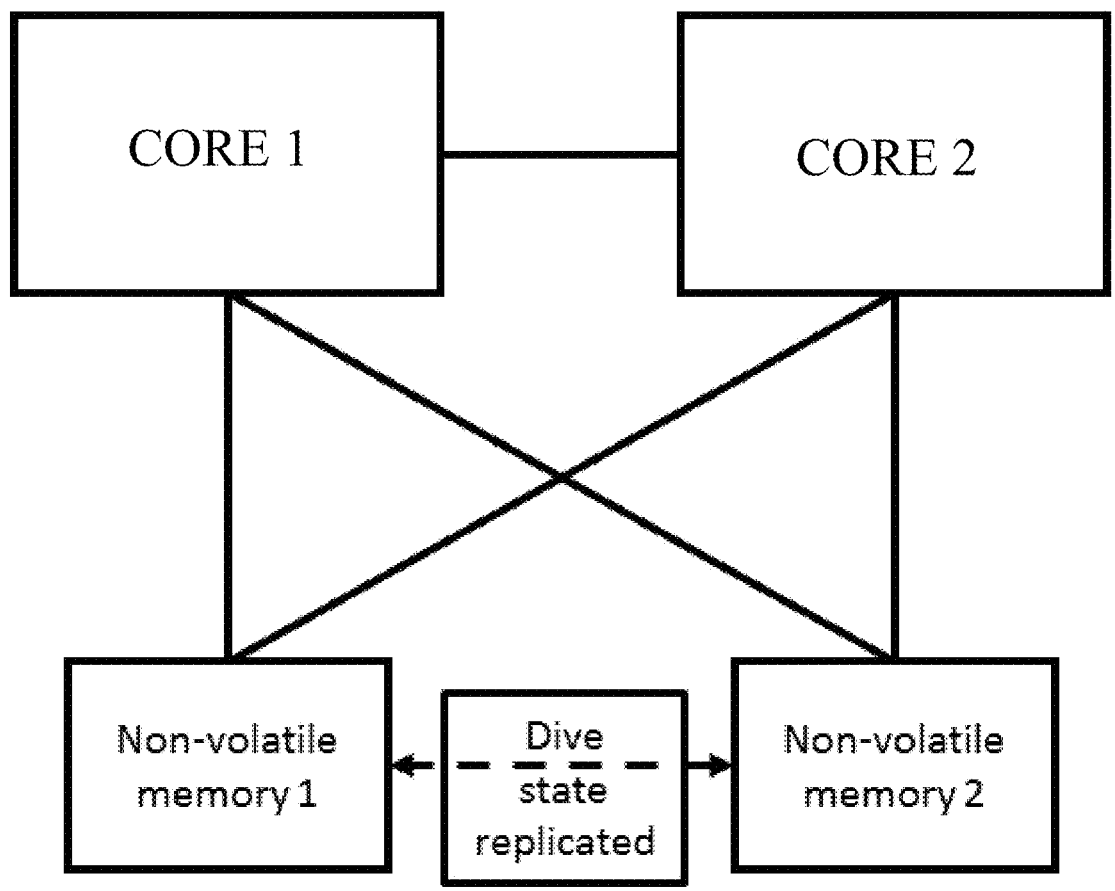
FIG. 4 illustrates an example diving information apparatus in accordance with at least some embodiments of the present invention.

FIG. 4 illustrates an example diving information apparatus in accordance with at least some embodiments of the present invention. Illustrated are two processing cores, CORE 1 and CORE 2. The cores may be microcontroller cores, for example, or one of them may be a microcontroller core and the other a microprocessor core. One of the cores may be more capable, and consume more power, than the other one. Thus, for example, a first microcontroller core may be more power-hungry than another microcontroller core in case both CORE1 and CORE2 are microcontroller cores. CORE1 and CORE2 may be comprised in a same integrated circuit, or they may be comprised in distinct integrated circuits, such as microcontroller(s) or microprocessor(s).

The system of FIG. 4 further comprises two non-volatile memories, one for each processing core, and a replication mechanism configured to replicate dive information between the non-volatile memories. In effect, where the first processing core CORE1 maintains the dive information in non-volatile memory 1, the replication mechanism maintains an identical dive information in non-volatile memory 2. The replication mechanism may be external to the first processing core and the second processing core, whereby in case one of the processing cored develops a fault, the replication will continue. Alternatively to two non-volatile memories, the diving information apparatus may comprise a single non-volatile memory, such that both processing cores may access the single non-volatile memory. The non-volatile memories may be of different types, such as, produced by different manufactures, and/or based on different underlying technology, such as NAND and NOR flash. The different types make it less likely, that both non-volatile memories fail at the same time. The non-volatile memories may be external to the processing cores and/or the integrated circuit(s) where the processing cores are comprised. In some embodiments, the non-volatile memory or non-volatile memories are comprised in a same integrated circuit as both of the processing cores, in embodiments where the processing cores are comprised in the same integrated circuit.

Optionally, second processing core CORE2 may have an interface with non-volatile memory 1, and first processing core CORE 1 may have an interface with non-volatile memory 2. These optional interfaces enable checking the replication mechanism works properly.

In general, the diving information apparatus may comprise two pressure sensors, a barometric pressure sensor and a second pressure sensor configured to determine, from water pressure, a water depth of the diving information apparatus. The barometric pressure sensor may be configured to measure atmospheric pressure and pressure of water up to a depth of ten or twenty meters, for example. The second pressure sensor may be configured to measure water pressure up to 40, 50, 60, 80 or 100 meters, for example. In detail, there may be a region of depth overlap of active ranges of the pressure sensors, for example between water surface and a depth of ten or twenty meters, where both pressure sensors are enabled to produce a pressure reading.

The two pressure sensors may be integrated on a same chip, or they may be disposed in the diving information apparatus as distinct components.

The first and second processing cores may both be capable of receiving input from both of the two pressure sensors. When the diving information apparatus is in the region of depth overlap, one or both of the processing cores may compare pressure readings from the two pressure sensors, and responsive to determining the pressure sensors produce inconsistent information indicating two different depths, a warning signal may be provided to the user that depth information has become unreliable. In other words, a warning may be provided to the user as a response to determining the two pressure sensors provide pressure data inconsistent with each other. The user may then choose to abort the dive. This may occur in case one of the pressure sensors malfunctions during a dive, creating what may become a dangerous situation. For example, descending deeper than the region of depth overlap may be avoided by aborting the dive when still in the region of depth overlap.

In case the user descends toward the lower bound of the region of depth overlap, the diving information apparatus may be configured to close off the barometric pressure sensor from the water to prevent it from being damaged by high pressure. On the other hand, additionally or alternatively, when the diver approaches the region of depth overlap from below, the diving information apparatus may be configured to expose the barometric pressure sensor to the water pressure once the device re-enters the region of depth overlap. A further mechanism to protect the barometric pressure sensor is to decouple it from an electrical current source when descending toward the lower bound of the region of overlap. The decoupling may be performed without the closing off and/or the exposing mentioned in this paragraph, or it may be performed in combination with this closing off and/or this exposing.

Figure 5:
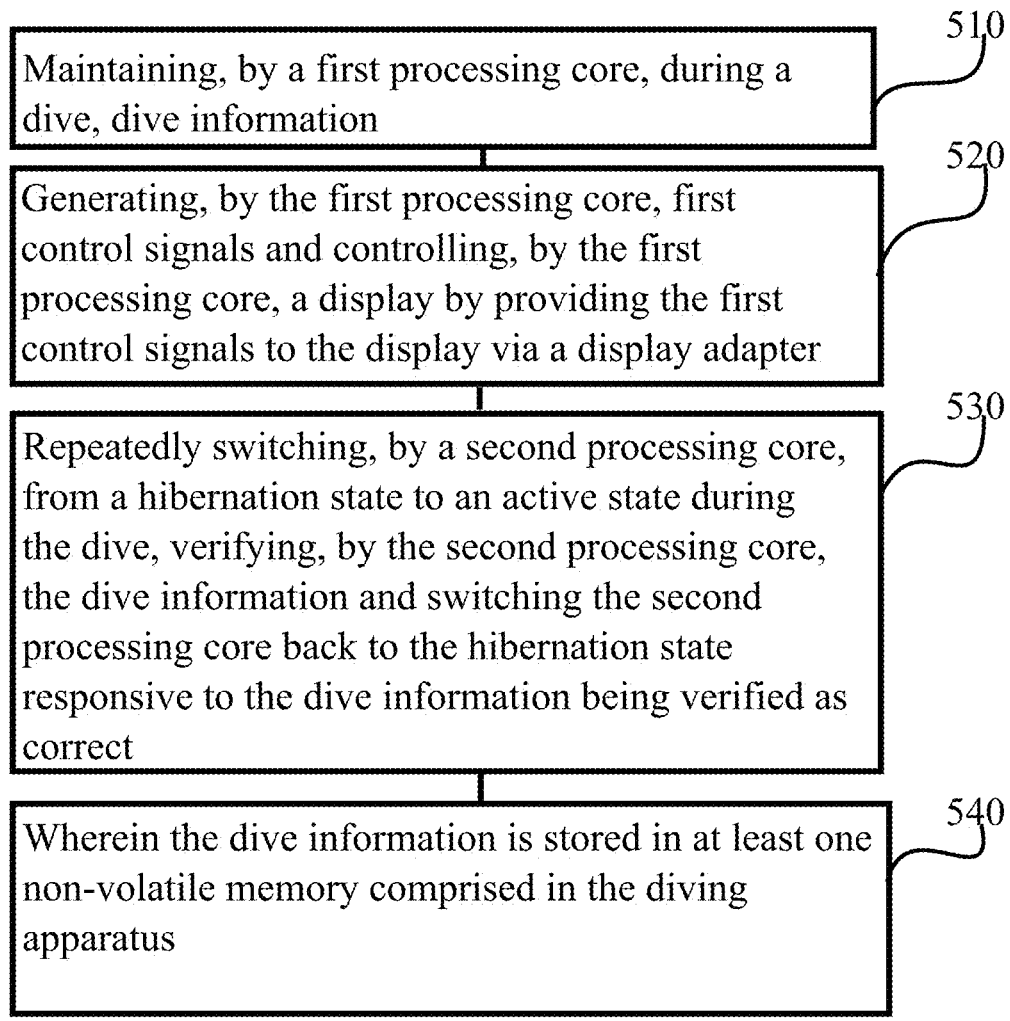
FIG. 5 is a first flow chart of a first method in accordance with at least some embodiments of the present invention.

FIG. 5 is a first flow chart of a first method in accordance with at least some embodiments of the present invention. The phases of the illustrated method may be performed in device 110 of FIG. 1, or in the apparatus of FIG. 2, for example.

Phase 510 comprises maintaining, by a first processing core, during a dive, dive information which concerns progress of the dive. Phase 520 comprises generating, by the first processing core, first control signals and controlling, by the first processing core, a display by providing the first control signals to the display via a display interface. Phase 530 comprises repeatedly switching, by a second processing core, from a hibernation state to an active state during the dive, verifying, by the second processing core, the dive information and switching the second processing core back to the hibernation state responsive to the dive information being verified as correct. Phase 540 comprises the dive information is stored in at least one non-volatile memory comprised in the diving information apparatus.

Figure 6:
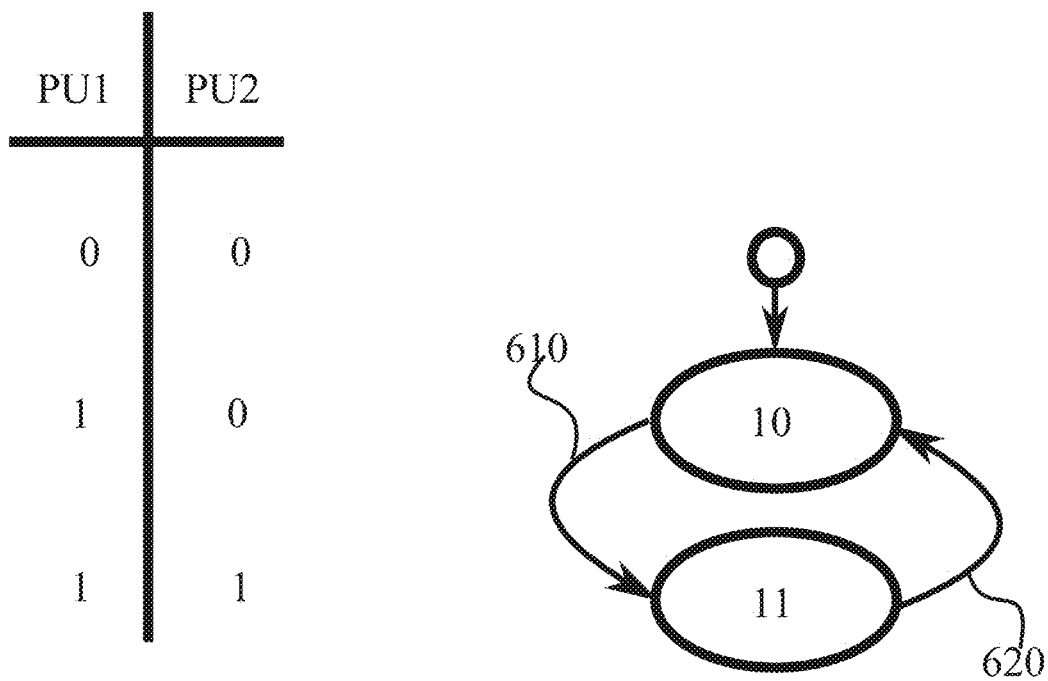
FIG. 6 is a state transition diagram in accordance with at least some embodiments of the present invention.

FIG. 6 is a state transition diagram in accordance with at least some embodiments of the present invention.

PU1 corresponds to processing unit 1, for example, a less capable processing unit. PU2 corresponds to processing unit 2, for example, a more capable processing unit. These units may be similar to those in discussed in connection with FIG. 4, for example. In an initial state, the device comprising PU1 and PU2 is in an inactive state, with zeros indicating the states of both PU1 and PU2. PU1 and PU2 are both switched off.

Starting from the initial power-off state, first PU1 is powered up, indicated as a "1" in the state of PU1, while PU2 remains in an off state, denoted by zero. Thus the compound state is "10", corresponding to a case where PU1 is active and PU2 is not. In this state, the device may offer a reduced experience to a user and consume relatively little current from battery reserves.

In addition to, or alternatively to, a power-off state PU1 and/or PU2 may have an intermediate low-power state from which it may be transitioned to an active state faster than from a complete power-off state. For example, a processing unit may be set to such an intermediate low-power state before being set to a power-off state. In case the processing unit is needed soon afterward, it may be caused to transition back to the power-up state. If no need for the processing unit is identified within a preconfigured time, the processing unit may be caused to transition from the intermediate low-power state to a power-off state.

Arrow 610 denotes a transition from state "10" to state "11", in other words, a transition where PU2 is transitioned from the hibernated state to an active state, for example, a state where its clock frequency is non-zero. PU1 may cause the transition denoted by arrow 610 to occur, for example, responsive to a triggering event. In state "11", the device may be able to offer a richer experience, at the cost of faster battery power consumption.

Arrow 620 denotes a transition from state "11" to state "10", in other words, a transition where PU2 is transitioned from an active state to the hibernated state. PU1 may cause the transition denoted by arrow 620 to occur, for example, responsive to a triggering event.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, described features, structures, or characteristics may be combined in any suitable or technically feasible manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. A diving information apparatus comprising:
   a first processing core configured to maintain, during a dive, dive information which concerns progress of the dive, to generate first control signals and to control a display by providing the first control signals to the display via a display interface; and
   a second processing core configured to repeatedly switch from a hibernation state to an active state during the dive, to verify the dive information and to switch back to the hibernation state responsive to the dive information being verified as correct,
   wherein the dive information is stored in at least one non-volatile memory comprised in the diving information apparatus.

2. The diving information apparatus according to claim 1, wherein the first processing core uses less power when in an active mode, than the second processing core when the second processing core is not in the hibernation state.

3. The diving information apparatus according to claim 2, wherein the first processing core is comprised in a microcontroller and the second processing core is comprised in a microprocessor, the microcontroller being external to the microprocessor and the microprocessor being external to the microcontroller.

4. The diving information apparatus according to claim 1, further comprising two pressure sensors, wherein the first processing core is configured to receive pressure sensor data from both pressure sensors when the diving information apparatus is within a region of depth overlap between active ranges of the two pressure sensors, and to provide a warning to the user as a response to determining the two pressure sensors provide pressure data inconsistent with each other.

5. The diving information apparatus according to claim 1, wherein the dive information comprises at least one of: a remaining time before ascent should begin, a remaining amount of air, messages from other divers and depth as a function of time.

6. The diving information apparatus according to claim 1, wherein the first processing core is configured to store the dive information in a first non-volatile memory and the second processing core is configured to access the dive information in a second non-volatile memory, the first and second non-volatile memories being arranged to replicate the dive information.

7. The diving information apparatus according to claim 6, wherein the first and second non-volatile memories are not of a same type.

8. The diving information apparatus according to claim 1, wherein the first processing core is configured to re-boot as a response to an error state occurring during the dive, and to resume maintaining the dive information after the re-boot.

9. The diving information apparatus according to claim 1, wherein the second processing core is configured to cause the first processing core to stop maintaining the dive information as a response to the dive information being verified as incorrect.

10. The diving information apparatus according to claim 9, wherein the second processing core is configured to maintain the dive information for a remainder of the dive subsequent to stopping the first processing core from maintaining the dive information.

11. The diving information apparatus according to claim 1, wherein the at least one non-volatile memory is external to the first processing core and the second processing core.

12. The diving information apparatus according to claim 1, wherein the diving information apparatus is further configured to trigger the second processing core from the hibernation state to the active state as a response to a determination that less than a predetermined length of time remains before ascent toward a surface should start, and to use the second processing core to provide graphical warning to the user, the graphical warning being of a type the first processing core cannot provide.

13. A method in a diving information apparatus, comprising:
   maintaining, by a first processing core, during a dive, dive information which concerns progress of the dive, generating, by the first processing core, first control signals and controlling, by the first processing core, a display by providing the first control signals to the display via a display interface; and repeatedly switching, by a second processing core, from a hibernation state to an active state during the dive, verifying, by the second processing core, the dive information and switching the second processing core back to the hibernation state responsive to the dive information being verified as correct, wherein the dive information is stored in at least one non-volatile memory comprised in the diving information apparatus.

14. The method according claim 13, wherein the first processing core uses less power when in an active mode, than the second processing core when the second processing core is not in the hibernation state.

15. The method according claim 14, wherein the first processing core is comprised in a microcontroller and the second processing core is comprised in a microprocessor, the microcontroller being external to the microprocessor and the microprocessor being external to the microcontroller.

16. The method according to claim 13, wherein the diving information apparatus comprises two pressure sensors, wherein the first processing core receives pressure sensor data from both pressure sensors when the diving information apparatus is within a region of depth overlap between active ranges of the two pressure sensors, and provides a warning to the user as a response to determining the two pressure sensors provide pressure data inconsistent with each other.

17. The method according to claim 13, wherein the dive information comprises at least one of: a remaining time before ascent should begin, a remaining amount of air, messages from other divers and depth as a function of time.

18. The method according to claim 13, further comprising storing, by the first processing core, the dive information in a first non-volatile memory and accessing, by the second processing core, the dive information in a second non-volatile memory, the first and second non-volatile memories being arranged to replicate the dive information.

19. The method according to claim 18, wherein the first and second non-volatile memories are not of a same type.

20. The method according to claim 13, further comprising re-booting the first processing core as a response to an error state occurring during the dive, and resuming maintaining the dive information by the first processing core after the re-boot.

21. The method according to claim 13, further comprising causing, by the second processing core, the first processing core to stop maintaining the dive information as a response to the dive information being verified as incorrect.

22. The method according to claim 21, wherein the second processing core maintains the dive information for a remainder of the dive subsequent to stopping the first processing core from maintaining the dive information.

23. The method according to claim 13, wherein the at least one non-volatile memory is external to the first processing core and the second processing core.

24. A non-transitory computer readable non-transitory medium having stored thereon a set of computer readable instructions that, when executed by at least one processor, cause a diving information apparatus to at least:

maintain, by a first processing core, during a dive, dive information which concerns progress of the dive, generate, by the first processing core, first control signals and control, by the first processing core, a display by providing the first control signals to the display via a display interface; and repeatedly switch, by a second processing core, from a hibernation state to an active state during the dive, verify, by the second processing core, the dive information and switch the second processing core back to the hibernation state responsive to the dive information being verified as correct, wherein the dive information is stored in at least one non-volatile memory comprised in the diving information apparatus.

* * * * *